Jan. 29, 1935.  W. D. COOLIDGE  1,989,610
ELECTROSTATIC MACHINE
Filed March 2, 1932   2 Sheets-Sheet 2
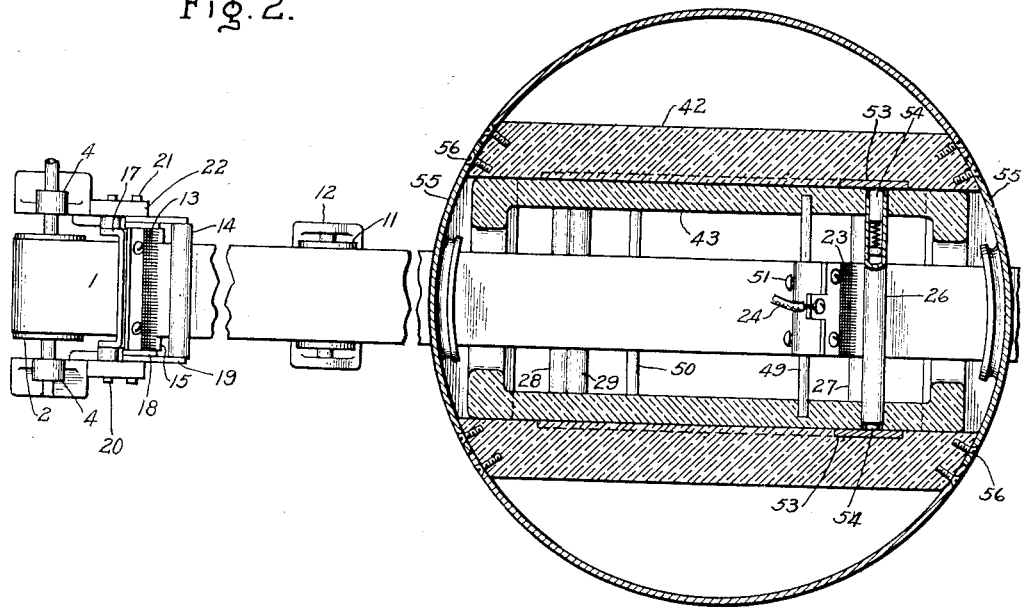
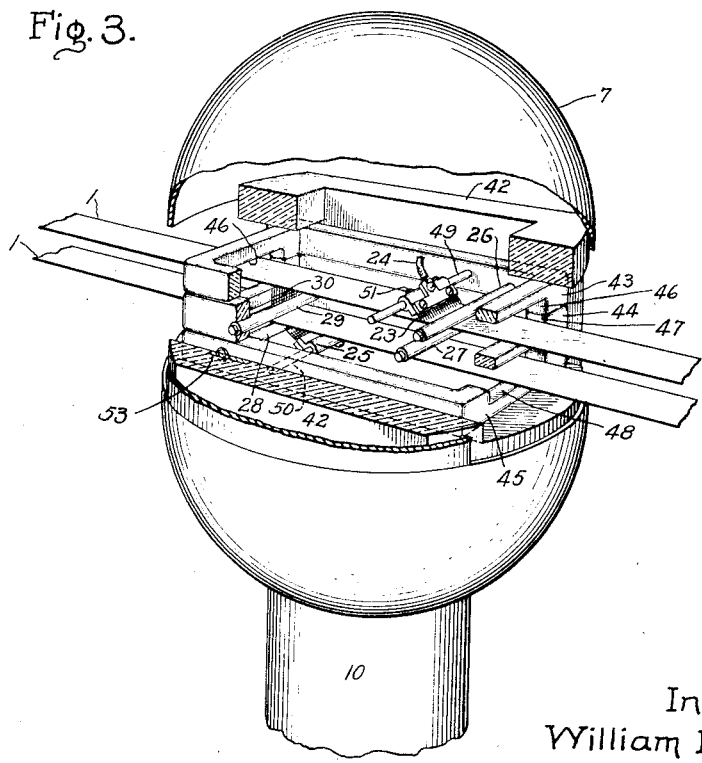
Inventor
William D. Coolidge
by Charles A. Tullar
His Attorney.

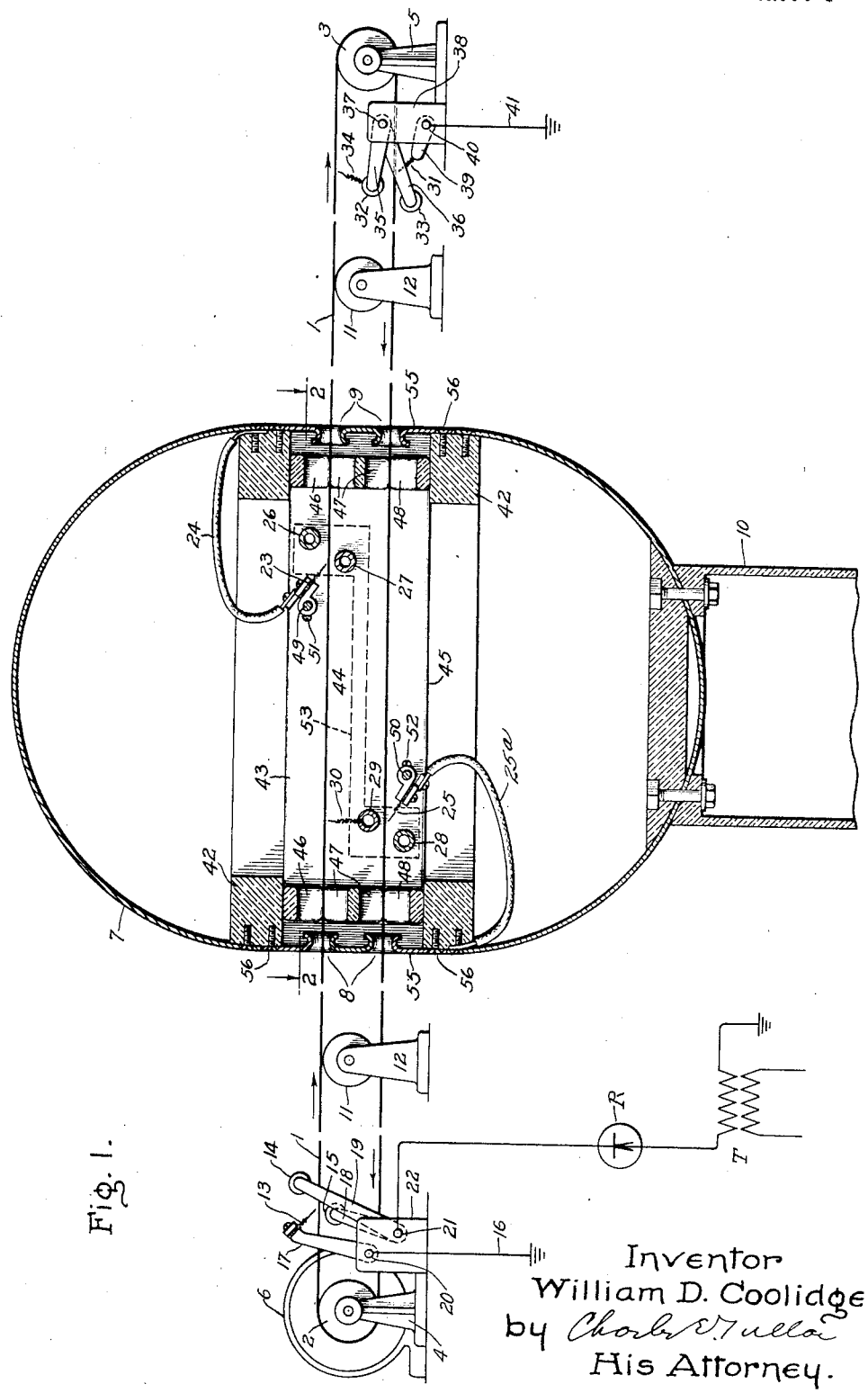

Patented Jan. 29, 1935

1,989,610

UNITED STATES PATENT OFFICE 1,989,610

ELECTROSTATIC MACHINE

William D. Coolidge, Schenectady, N. Y., assignor to General Electric Company, a corporation of New York Application March 2, 1932, Serial No. 596,232

17 Claims. (Cl. 171—329)

My invention relates to electrostatic machines.

It is often desirable to utilize an electrostatic machine to produce extremely high voltage of the order of a million volts. In obtaining this voltage it is necessary to provide a charge-accumulating body to which the charge carrying element of the electrostatic machine delivers its charge to build up the desired voltage. A body on which a charge is accumulated in this way has the entire electrical charge distributed on the outer surface thereof, so that the charge carried to the body by the charge-conveying element cannot be effectively transferred to the outer surface of the body. This is due to the fact that when the machine is in operation the moving element will give up to the outer surface of the body only a small proportion of its charge to lower its potential to that on the body. It is therefore desirable to transfer the charge from the moving element to the body inside thereof. It is well known that the inside of any charged body is at zero potential, and that if a charge like that on the body is introduced into the same body, it will immediately pass by any conducting path afforded to the surface of the body. For this reason, in constructing a high voltage electrostatic machine of this type the devices employed for conveying the electrical charge from the moving element to the body, or for conveying the opposite charge from the body to the moving element, to increase the charge thereon, are arranged inside of the body. In arrangements heretofore proposed for this purpose it has been difficult to make these devices accessible for adjustment or repair.

An object of my invention is to provide an arrangement for supporting the device arranged within the charge-accumulating body for conveying the charge on the moving element to the body or for oppositely charging the moving element to increase the charge on the body, which will permit these devices to be readily adjusted or removed for adjustment or replacement.

Further objects and advantages of my invention will become apparent as the following description proceeds, and the features of novelty which characterize my invention will be pointed out with particularity in the claims annexed hereto and forming a part of this specification.

In the drawings, Fig. 1 is a longitudinal sectional view of a separately excited electrostatic machine embodying my invention; Fig. 2 is a sectional view on the line 2—2 of Fig. 1; and Fig. 3 is a perspective view of the construction shown in Figs. 1 and 2, partly broken away to more clearly illustrate the construction.

Referring to the drawings, the electrostatic machine which I have illustrated embodying my invention is of the separately excited type, and includes an endless belt 1 of paper, varnished cambric, silk or other suitable material, which is supported in the form of an elongated loop on rollers 2 and 3. These rollers are suitably mounted in bearing supports 4 and 5, and the belt is driven by an electric motor 6, or other suitable device, which is connected in any convenient manner to the roller 2. A charge-accumulating body 7 is arranged about the belt-loop intermediate the ends thereof, and is provided with openings 8 and 9 through which the belt-loop extends. The body 7 is supported on an insulating column 10 of sufficient height to withstand the high voltage of the electric charge accumulated on the body. The insulating belt-loop is made long enough to separate the rollers 2 and 3 sufficiently from the body 7 to prevent any direct electrical discharge or leakage from the body to the part of the construction associated with the rollers. The belt offers sufficient resistance to the flow of any charge on the body to prevent any substantial loss of charge therefrom. If desired, the body may be charged to obtain several million volts, and the voltage obtained depends upon the size of the body and the general design of the machine.

In order to obtain the maximum output of current from this machine, and effectively utilize substantially the entire length of the belt-loop, the portions of the belt-loop moving from the rollers toward the body are charged, and the portions of the belt-loop moving from the body to the rollers are oppositely charged to increase the electrical charge on the body, by an arrangement to be hereinafter described. If the voltage accumulated on the body 7 is very high, it may be necessary to make the belt-loop 1 quite long to avoid a direct electrical discharge from the body to the rollers 2 and 3, and the devices associated therewith. The adjacent sides of the belt-loop are oppositely charged so that they are attracted toward each other, and if a long belt-loop is employed, the sides thereof will be drawn close together by the electrical charges and cause undue mechanical loss due to friction between the sides of the belt, and electrical loss due to leakage of the electrical charge from one side of the belt to the other so as to reduce the output of the machine. In order to prevent the belt being drawn together by the electrical charges in this way, I may employ insulating rollers 11 which are arranged between the sides of the belt-loop and mounted on bearing supports 12. It will be understood that the rollers 11 and the supports 12 will be arranged and suitably insulated as required to prevent any direct electrical discharge between the body 7 and the rollers 11 and their supports.

In the construction illustrated, I separately excite the belt-loop 1 adjacent the roller 2 by a collector 13 and electrically connecting field pieces 14 and 15 which are connected across a high voltage source of supply. The collector 13 is arranged adjacent the surface of the belt 1 and has a number of sharp points extending closely adjacent the surface of the belt across the entire width thereof, so as to facilitate the flow of an electrical charge between the points and the belt. The field pieces 14 and 15 are arranged adjacent opposite sides of the belt 1 and adjacent the collector 13. The collector 13 and the field pieces 14 and 15 may be connected across a high voltage source of supply in any suitable manner to establish an electric field between the field pieces and the collector. This electric field charges the belt 1 as it passes between the field pieces and toward the body 7. As shown in the drawings, the collector 13 and the field pieces 14 and 15 are connected across a source of high voltage supply by grounding the collector at 16 and one terminal of the transformer T, and connecting the other terminal of the transformer to the field pieces through a rectifying device R. The collector 13 and the field pieces 14 and 15 are adjustably supported on conducting arms 17, 19 and 18 respectively, which are pivotally mounted at 20 and 21 on an insulating support 22. By this arrangement the relation of the collector 13 and the electrically connected field pieces 14 and 15 can be adjusted to obtain the maximum charge on the belt. The electrical charge imparted to the belt-loop in this manner is carried to the inside of the body 7 and passes to the collector 30 to maintain the potential of the field pieces 26, 27, 28 and 29 above the body 7. The remainder of the charge passes therefrom to the body through a collector 23 which extends closely adjacent the surface of the belt and across the entire width thereof. This collector is connected to the inside of the body by a conductor 24. A similar collector 25 is provided for conveying to the inside of the body the charge, which is carried into the body on the portion of the belt moving from the roller 3 into the body, and a conductor 25a connects the collector 25 to the inside of the body 7. These collectors may also be connected to the body by a spring clip connected to the body 7, or in any other suitable manner. It is well known that the inside of a charge accumulating body of this kind is at zero potential and that any charge conveyed into the same will immediately flow in any conducting path provided to the outer surface of the body.

The portion of the belt passing from the collectors 23 and 25 to the rollers 3 and 2 is charged oppositely to the charge on the body 7 to increase the charge thereon. This is done by arranging the electrically connected field pieces 26, 27, 28 and 29 adjacent the belt and the collectors 23 and 25. I utilize a portion of the charge carried into the body 7 by the belt 1 for exciting these field pieces, and I accomplish this by providing a collector 30 on the field piece 29, which extends adjacent the inner surface of the belt. In this way a portion of the charge carried into the body 7 on the belt 1 passes to the field pieces 26, 27, 28 and 29, and raises their potential sufficiently to establish an electric field between the field pieces and the collectors 23 and 25, so as to charge the portion of the belt passing from the collectors toward the rollers 3 and 2 oppositely to the charge on the body 7, and in this way increase the charge on the body. In order to excite the portion of the belt moving from the roller 3 toward the body 7, I provide a collector 31 and electrically connected field pieces 32 and 33 arranged adjacent opposite sides of the belt near the collector, and a collector 34 on the field piece 32, which extends closely adjacent the inner surface of this portion of the belt. In this way the charge carried from the body 7 toward the roller 3 excites the field pieces 32 and 33, and produces an electric field between the field pieces and the collector 31, so that the portion of the belt moving from the roller 3 toward the body 7 is charged as required to increase the electrical charge on the body 7. The field pieces 32 and 33 are electrically connected by metal supporting arms 35 and 36 which are pivotally connected at 37 to an insulating support 38. The collector 31 is supported on a conducting arm 39 which is pivotally supported at 40 on the insulating support 38 and grounded as indicated at 41. By this arrangement the relation of the field pieces and the collector 31 can be readily adjusted to obtain the maximum charge on the belt.

It is desirable to provide an arrangement in which the belt loop can be readily placed in the machine and the relation of the field pieces 26, 27, 28 and 29 can be adjusted with respect to their adjacent collectors 23 and 25, to obtain the maximum charge on the portions of the belt moving from the collectors toward the rollers, and in which the field pieces and collectors can be removed from the body 7 for adjustment or repair. In accordance with my invention this is accomplished by employing removable slides in the body 7 on which the field pieces and collectors are mounted. As shown in the drawings this construction includes an insulating support 42 secured within the body 7 having insulating slides or supports 43, 44 and 45 provided with notches 46, 47 and 48 to accommodate the belt-loop and slidably mounted within the body, and mounting the field pieces and collectors on these slides in such manner that they can readily be removed from the body 7 or adjusted as desired. The collectors 23 and 25 are pivotally mounted on rods 49 and 50 and their position can be adjusted by loosening the set screws 51 and 52. The rod 49 and field piece 26 are carried by the slide 43 arranged on one side of the belt-loop, and the rod 50 and field piece 28 are mounted on the slide 45 which is arranged on the other side of the belt-loop. The field pieces 27 and 29 are secured to the slide 44 between the sides of the belt-loop. The field pieces 26, 27, 28 and 29 are arranged to be electrically connected together in response to placing the slides within the body 7. This is accomplished by providing conducting members or plates 53, arranged in recesses in the side of the insulating support 42, which are adapted to be engaged by spring pressed contacts 54 arranged at the ends of the field pieces, as clearly shown in Figs. 2 and 3. The slides 43, 44 and 45 are made somewhat shorter than the inside diameter of the body 7, so that they can be adjusted and secured in adjusted position, and removable metal closure plates 55 are arranged at opposite ends of the slides to provide access to the slides for removal or adjustment. These closure plates are secured to the body by screw 56 and are provided with inwardly flared openings 8 and 9 to minimize any electrical discharge from the body about these openings.

By removing the cover plates 55 and the slides 43, 44 and 45, in this construction, the endless belt 1 can be replaced in the body and supported on the rollers 2 and 3. The slides and cover plates can then be replaced and operation of the machine resumed.

During the operation of the electrostatic machine, which I have described, the elongated belt-loop 1 is driven at high speed by the electric motor 6. In order to obtain a large current output from the machine, I maintain the surface speed of the belt-loop at about 9000 feet per minute, although higher speeds may sometimes be desirable. The portion of the belt-loop moving from the roller 2 toward the charge accumulating body 7 is electrically charged from the high voltage source of supply T by the electric field established between the collector 13 and the field pieces 14 and 15. The charge imparted to the belt from this separate source of excitation is carried into the body 7 where it passes thereto through the collectors 30 and 23 and conductor 24. A portion of the electrical charge carried in this way into the body 7 passes to the collector 30 carried by the field piece 28 to excite the field pieces 26, 27, 28 and 29, which establishes an electrical field between these field pieces and the collectors 22 and 25. The electric field established in this way charges the portion of the belt-loop moving from the collectors 23 and 25 toward the rollers 3 and 2 respectively oppositely to the charge on the body 7, to increase the charge thereon. The charge imparted to the portion of the belt moving from the collector 23 to the roller 3 is entirely removed by conduction through the roller 3 when the belt passes over the same, or by the collector 31 which is grounded. A portion of the electrical charge carried on the belt from the collector 23 to the roller 3 is removed by the collector 34 carried by the field piece 32. This raises the potential of the electrically connected field pieces 32 and 33 and establishes an electric field between these field pieces and the collector 31, which produces a charge on the portion of the belt moving from the collector 31 toward the body 7 like the charge on the body. The charge is carried on the belt from the exciting device adjacent the roller 3 inside of the body to the collector 25 through which it passes to the conductor 25a to the outer surface of the body. The electric field established between the collector 25 and the field pieces 28 and 29 charges the belt moving from the collector 25 toward the roller 2 oppositely to the charge on the body to increase the charge thereon. This charge is carried by the belt from the collector 25 to the roller 2 and it is removed from the belt through the roller 2 or is carried around to the collector 13 where it passes therefrom to ground.

The high voltage charge accumulated on the body 7 may be withdrawn therefrom to supply any suitable load for testing purposes, or exciting an electric discharge device, such as an X-ray tube, in any convenient manner. It will be understood that this connection for withdrawing the charge from the body 7 should be constructed in such manner as to avoid excessive leakage of the charge into the surrounding air. This may be accomplished by suitably connecting a sphere, which is insulated from ground, to the load device, and arranging this sphere in contact with the body 7. When the machine is utilized to excite an electric discharge device, the charge may be supplied directly thereto by supporting the device adjacent the body 7.

I do not broadly claim an electrostatic machine of the endless belt type having a belt supported in the form of an elongated loop and having the charge accumulating body arranged about the belt-loop intermediate the ends thereof, nor do I claim as my invention broadly an arrangement of a collector and electrically connected field pieces arranged adjacent opposite sides of a moving charge conveying element, such inventions being broadly claimed in the application, Serial No. 596,187, of Clifford A. Nickle, filed March 2, 1932, which is assigned to the General Electric Company, assignee of this application, the invention claimed in this application being mainly directed to the arrangement of collecting, or exciting devices, within a charge accumulating body in such manner as to facilitate their adjustment and replacement.

Although I have described the particular embodiment of my invention, I do not desire to be limited to the particular construction set forth herein and I intend to cover in the appended claims all modifications thereof which do not depart from the spirit and scope of my invention.

What I claim as new and desire to secure by Letters Patent of the United States is:

1. An electrostatic machine including a charge accumulating body, a moving element for conveying an electrical charge into said body, a collector within said body for transferring the charge on said element to said body, and means including a support slidably removable from said body for supporting said collector.

2. An electrostatic machine having a charge accumulating body, means including a moving element for conveying an electrical charge into said body, a collector adjacent said element, a field piece adjacent said element opposite said collector, and means slidably mounted in said body for adjustably supporting said collector and said field piece.

3. An electrostatic machine having a charge accumulating body, means including a moving element for conveying an electrical charge into said body, a collector adjacent one side of said element, a field piece adjacent the other side of said element and opposite said collector, and means slidably mounted in said body for adjusting said collector and said field piece with respect to each other.

4. An electrostatic machine having a charge accumulating body, means including a moving element for conveying an electrical charge into said body, a collector adjacent said element, field pieces electrically connected together and arranged adjacent opposite sides of said element, and means slidably mounted in said body for adjusting said field pieces and said collector, with respect to each other.

5. An electrostatic machine having a charge accumulating body, means including a moving element for conveying an electrical charge into said body, means including field pieces in said body and arranged on opposite sides of said element for charging said element, means removable from said body for supporting said field pieces, and means secured within said body for electrically connecting said field pieces in response to placing said field pieces in said body.

6. An electrostatic machine having an insulating belt, means for supporting said belt in the form of an elongated loop, a charge accumulating body surrounding both sides of said belt-loop, a collector within said body, and means including a slide removably arranged in said body adjacent said belt for supporting said collector.

7. An electrostatic machine having an insulating belt, means for supporting said belt in the form of an elongated loop, a charge accumulating body surrounding both sides of said belt-loop, a collector and field pieces arranged adjacent said belt within said body, and means including a slide mounted in said body for adjustably supporting said collector and field pieces.

8. An electrostatic machine having an insulating belt, means for supporting said belt in the form of an elongated loop, a charge accumulating body surrounding both sides of said belt-loop, a collector arranged within said body adjacent said belt, electrically connected field pieces adjacent opposite sides of said belt and adjacent said collector, a slide mounted in said body for supporting said collector and one of said field pieces, another slide mounted in said body for supporting the other of said field pieces, and means for electrically connecting said field pieces.

9. An electrostatic machine having an insulating belt, means for supporting said belt in the form of an elongated loop, a charge accumulating body surrounding both sides of said belt-loop, a collector arranged within said body adjacent said belt, electrically connected field pieces arranged within said body adjacent opposite sides of said belt and said collector, a slide mounted in said body for supporting said collector and one of said field pieces, another slide mounted in said body for supporting the other of said field pieces, and means for electrically connecting said field pieces in response to placing said slides in said body.

10. An electrostatic machine having an insulating belt, means for supporting said belt in the form of an elongated loop, a charge accumulating body surrounding both sides of said belt-loop, a collector arranged within said body adjacent said belt, field pieces arranged within said body adjacent said collector and adjacent opposite sides of said belt, a slide mounted in said body for supporting said collector and one of said field pieces, another slide mounted in said body for supporting the other of said field pieces, and means including a conducting member secured within said body for electrically connecting said field pieces in response to placing said slides in said body.

11. An electrostatic machine having an insulating belt, means for supporting said belt in the form of an elongated loop, a charge accumulating body surrounding both sides of said belt-loop, a collector arranged within said body adjacent said belt, field pieces arranged within said body adjacent said collector and adjacent opposite sides of said belt, a plurality of slides mounted in said body for adjustably supporting said collector and said field pieces, said collector and one of said field pieces being mounted on one of said slides, and the other of said field pieces being mounted on another of said slides, and a conducting member secured within said body arranged in such relation to said field pieces as to electrically connect them together when said slides are placed in said body.

12. An electrostatic machine having an insulating belt, means for supporting said belt in the form of an elongated loop, a charge accumulating body surrounding both sides of said belt-loop, field pieces and collectors arranged within said body and associated with opposite sides of portions of said belt-loop therein, means including slides arranged on both sides of said belt-loop, and another slide arranged between said first mentioned slides for adjusting said collector and said field pieces with respect to each other.

13. An electrostatic machine having an insulating belt, means for supporting said belt in the form of an elongated loop, a charge accumulating body surrounding both sides of said belt-loop, field pieces and collectors arranged within said body and associated with opposite sides of portions of said belt-loop therein, means including slides arranged on both sides of said belt-loop, and another slide arranged between said first mentioned slides for adjusting said collectors and said field pieces with respect to each other, and means including a conducting member secured within said body in contact with the ends of said field pieces for connecting them together when said slides are placed in said body.

14. An electrostatic machine having an insulating belt, means for supporting said belt in the form of an elongated loop, means for charging oppositely the opposite sides of said belt-loop, and means for preventing the sides of said belt-loop being drawn in close proximity to each other by the electrical charges thereon.

15. An electrostatic machine having an insulating belt, means for supporting said belt in the form of an elongated loop, means for oppositely charging the opposite sides of said belt-loop, and means including a separating member extending between the opposite sides of said belt-loop for preventing the sides of said belt-loop being drawn in close proximity to each other by the electrical charges thereon.

16. An electrostatic machine having an insulating belt, means for supporting said belt in the form of an elongated loop, means for oppositely charging the opposite sides of said belt-loop, and means including insulating rollers extending between opposite sides of said belt-loop for preventing the sides of said belt-loop being drawn in close proximity to each other by the electrical charges thereon.

17. An electrostatic machine having an insulating belt, means for supporting said belt in the form of an elongated loop, a charge accumulating body surrounding said belt-loop intermediate the ends thereof, means for oppositely charging the opposite sides of said belt-loop, and insulating means extending between the opposite sides of said belt-loop between the ends thereof and said charge accumulating body for preventing the sides of said belt-loop being drawn in close proximity to each other by the electrical charges thereon.

WILLIAM D. COOLIDGE.